Aug. 10, 1948.  W. W. KENNEDY  2,446,879
AIR FLOW CONTROL
Filed June 28, 1943  3 Sheets-Sheet 3

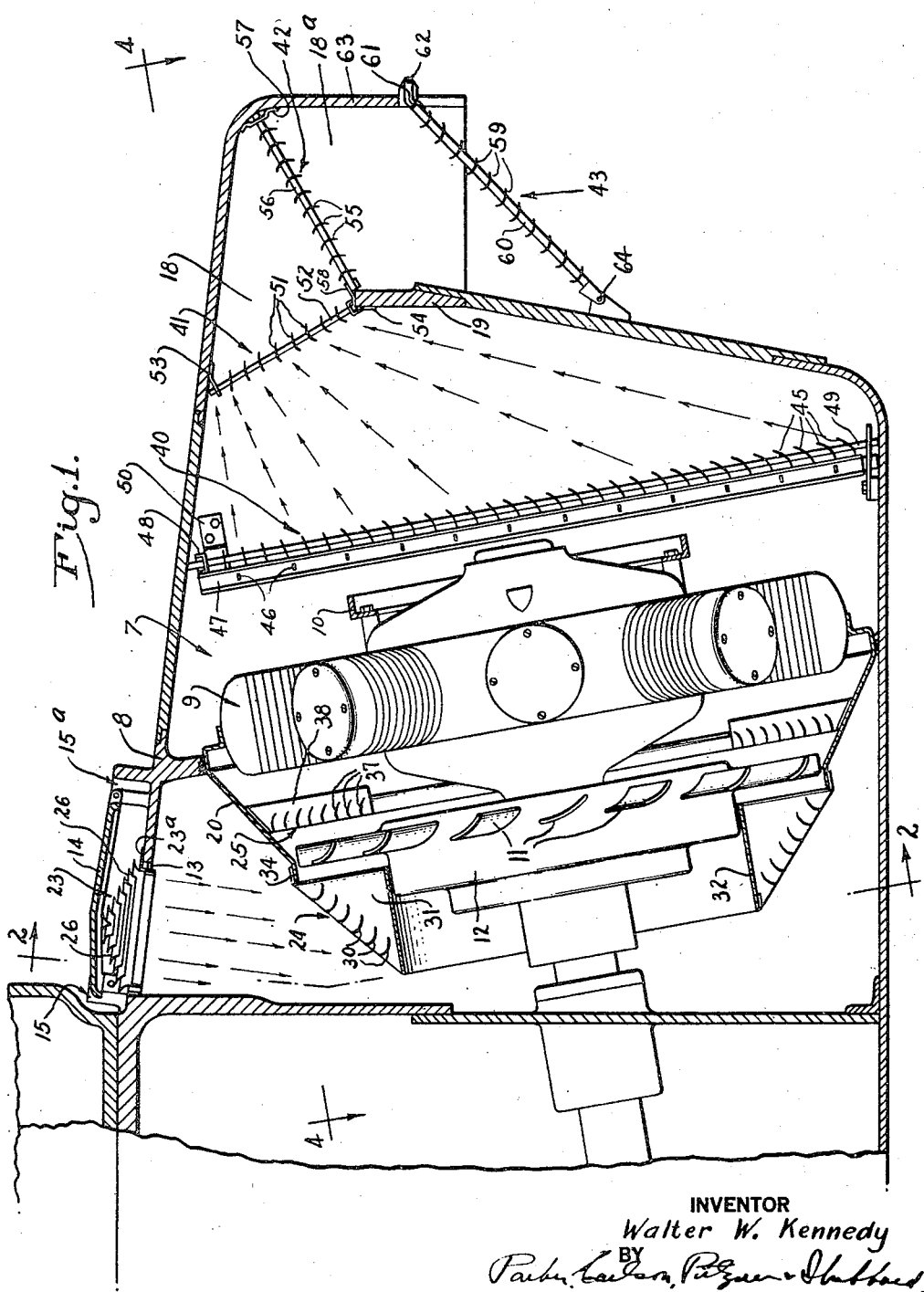

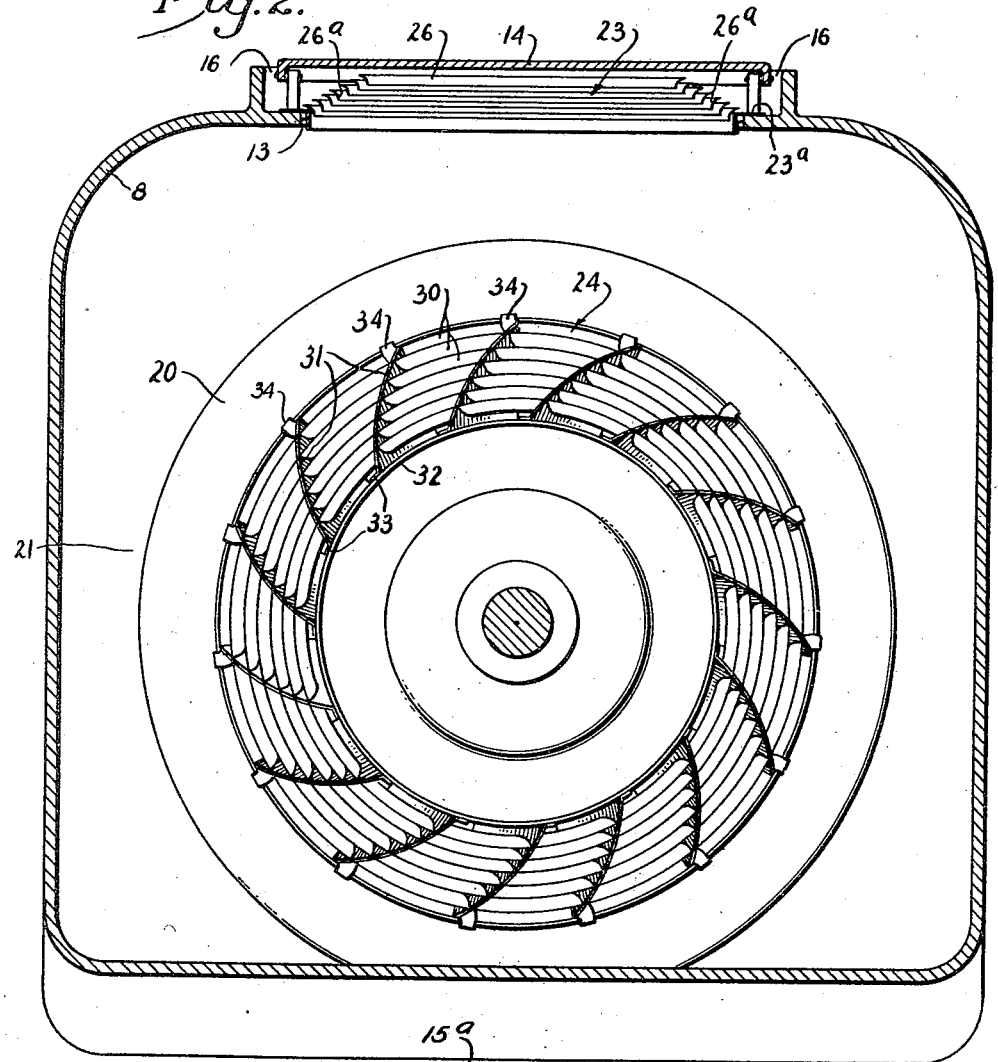
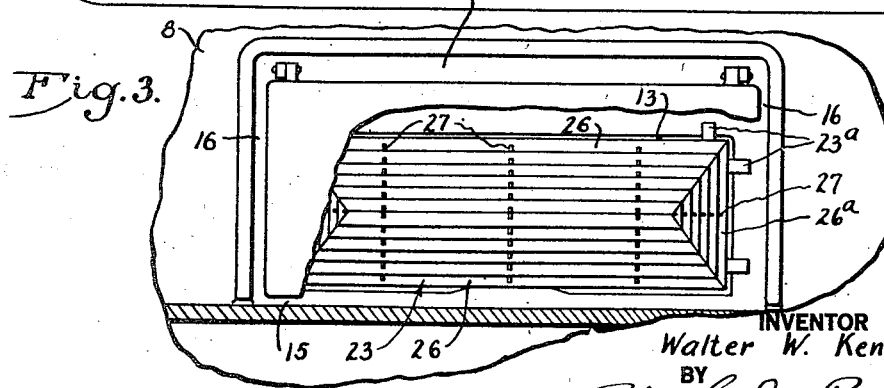

INVENTOR
Walter W. Kennedy
BY
ATTORNEYS

Patented Aug. 10, 1948

2,446,879

UNITED STATES PATENT OFFICE 2,446,879

AIR FLOW CONTROL

Walter W. Kennedy, Rockford, Ill., assignor to Barber-Colman Company, Rockford, Ill., a corporation of Illinois Application June 28, 1943, Serial No. 492,567

2 Claims. (Cl. 98—40)

The invention has for its general aim the conduction of air through or across a relatively large space or chamber without the use of ducts or like confining walls; and, in particular, it concerns air flow control apparatus for guiding and directing the air flowing through a space or chamber such as the engine compartment of an armored tank, wherein the air is required to travel through a circuitous or tortuous path and the use of confining and directing channels or ducts is not feasible.

In the case of tanks and other automotive vehicles having power plants of the so-called submerged type, the engine compartment is of necessity made relatively small but in the interest of space conservation, so that the motor and associated parts and devices substantially fill the space and hence greatly obstruct the passage of air therethrough. Moreover, the location of the compartment in the rear portion of the vehicle renders it necessary for the air inlet to be offset laterally, with the principal opening at the top of the compartment. Finally, in the case of armored vehicles, the air inlet and outlet openings are made relatively small and are necessarily protected against enemy fire. The result is that the volume of air forced through the power plant by means of the propeller fan of the motor has been found to be entirely insufficient for adequate cooling. A primary object of my invention, therefore, is to overcome this difficulty through the provision of means substantially increasing the volume of cooling air flowing through the motor compartment of a submerged power plant of the character referred to.

Another object is to control the air in its passage through the engine compartment so as to cause better distribution thereof relative to the motor.

In the case of an engine compartment having a small inlet opening at one side, as in an armored tank, the air entering the forward portion of the compartment moves transversely at high velocity. To deliver this air to the propeller fan without substantially retarding its flow while changing the direction thereof is another and important object of my invention.

A general object is to provide for the conduction of air through or across a relatively large space without the use of ducts or like confining walls.

The objects of the invention, thus generally stated, together with other and ancillary advantages, are attained by the construction and arrangement shown by way of illustration in the accompanying drawings forming a part hereof, in which:

Figure 1 is a fragmentary vertical sectional view through the rear portion of an armored tank and showing my invention applied to the submerged power plant of such a vehicle.

Fig. 2 is a transverse sectional view taken approximately on the line 2—2 of Fig. 1.

Fig. 3 is a fragmentary plan view with parts broken away to show an air flow control device associated with the air inlet opening of the engine compartment.

Figure 4:
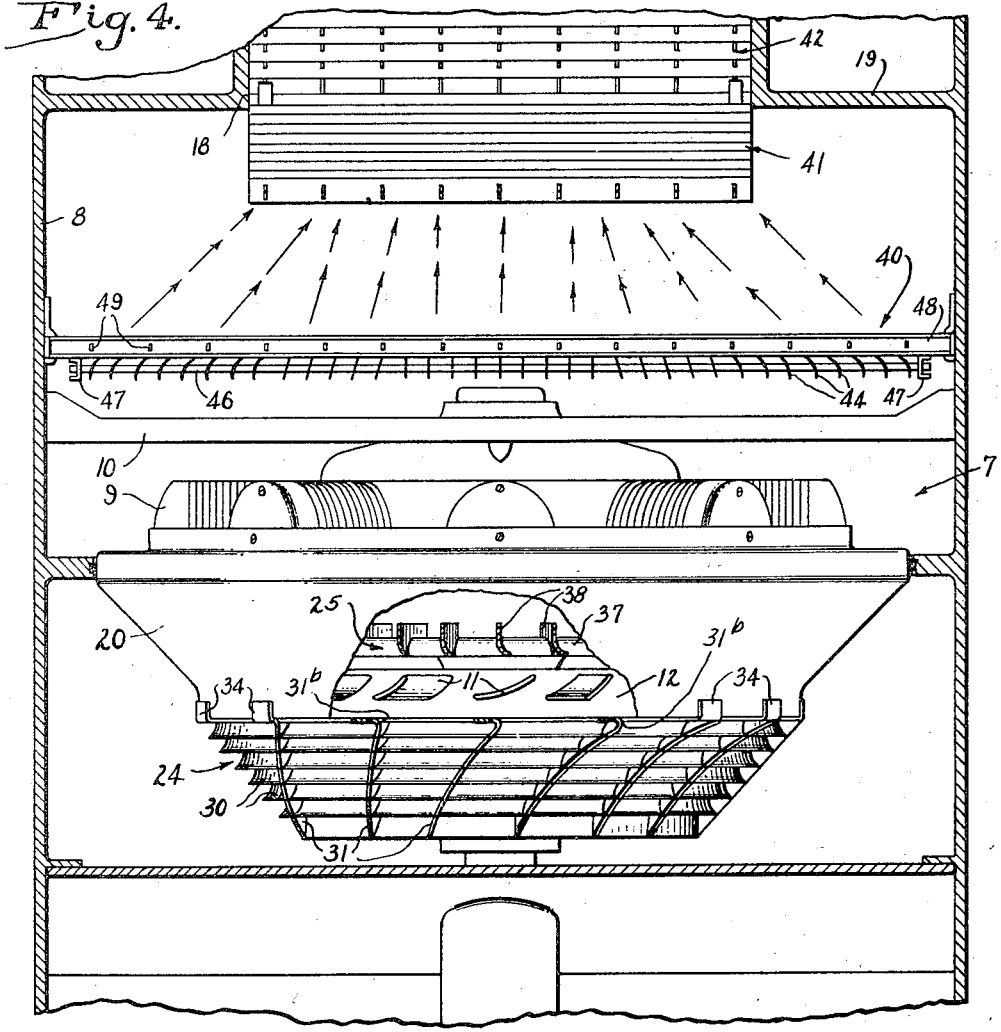
Fig. 4 is a fragmentary horizontal sectional view, on a somewhat smaller scale, taken approximately in the plane of line 4—4 of Fig. 1.

The invention being of special utility in the control and distribution of air flowing through the engine compartment of a submerged power plant, it is herein shown for purposes of illustration as applied to an armored tank of conventional construction. It is to be understood, however, that in its broader aspects the invention is not limited to such particular use, but is applicable in general to the control and direction of air through or across a space or chamber, by means of spaced grilles independently of the walls of the chamber and without the aid of the usual ducts or other guiding surfaces extending between the grilles.

Referring now to Fig. 1 of the drawings, the power plant for the automotive vehicle or tank comprises a motor or engine compartment 7 formed by a housing 8 and having mounted centrally thereof an internal combustion engine 9. As illustrated, the engine is of the radial cylinder type and is supported by means of a frame 10 substantially centrally of the motor compartment. For the sake of clarity, many parts and devices associated with the motor are omitted from the drawings. A fan of the propeller type is shown forwardly of the motor, having blades 11 mounted on a fly-wheel 12 of large diameter so that the blades are relatively short.

The principal air inlet for the motor compartment is located in the top of the housing 8. For this purpose, the housing is provided with a transversely elongated opening 13 normally covered by a hinged door 14 providing front and rear air entrance slots 15 and 15ᵃ and end slots 16. At its rear end, the compartment has a narrow outlet opening 18 (Figs. 1 and 4) located in the rear wall 19 immediately below the top wall. This opening is of a length considerably less than the width of the compartment.

As shown in Fig. 1, the air inlet opening 13 is disposed directly above the motor fan, the motor being tilted somewhat forwardly because of the downward and forward inclination of the drive shaft. A transverse partition formed by a frusto-conical shroud 20 and a supporting flange 21 is positioned in encircling relation to the motor, the fan being disposed within the circular opening formed at the forward reduced end of the shroud.

It is of course the intended function of the fan to produce a flow of air past the motor 9 in sufficient volume to maintain the latter at an efficient operating temperature. Experience has shown, however, that the fan is incapable of accomplishing this result, particularly when atmospheric temperatures are high, and the motor being insufficiently cooled its life is very substantially reduced. The present invention overcomes this serious objection in large measure through the provision of a system of air flow control devices of simple character, occupying a minimum of space, capable of easy application to existing tank structures while in the field, and offering no difficulty from the standpoint of accessibility, to the motor.

In the structural embodiment selected for purposes of illustration, I have shown a series of air control devices, each constituting essentially a grille having for its primary function the flow control of the cooling air in its passage through the motor compartment. One set of grilles located forwardly of the motor serves to direct and distribute the air first relative to the fan and then with respect to the motor, while a second set of grilles disposed rearwardly of the motor acts upon the air stream to facilitate its flow in a tortuous path as it is discharged from the motor compartment. The forward set of grilles is especially adapted to deliver the air to the fan at high velocity, notwithstanding a change in the direction of flow, and also to insure the discharge of the air by the fan axially of the motor; and the rear set of grilles conducts the air in a multiplicity of well defined streams to the rear outlet 18, so as to avoid eddying and recirculation of the air, thereby reducing back pressure to a minimum.

Referring now to Fig. 1 of the drawings, the forward set of grilles consists of three grilles 23, 24 and 25. The first of these is positioned in the inlet opening 13 in the top wall of the motor compartment. The second is disposed immediately in front of the fan blades 11, and the third is disposed between the fan and the motor proper.

In the present instance, the grille 23 is generally rectangular in form (Figs. 1 and 3) to conform to the shape of the inlet opening 13, and it is removably supported in this opening by brackets 23a. The grille consists of two groups of air guiding and directing elements in the form of thin narrow fins 26, extending longitudinally of the opening, and two end sets 26a.

The four groups of fins form, in effect, a four-sided pyramid. Thus the fins of each group are mounted upon bars 27 inclined relative to the plane of the opening with the fins of each group relatively elevated progressively from the edge toward the center, so that their upper edge portions project into the paths of the air streams entering through the slots 15, 15a and 16 into the space beneath the cover.

The fins of each group are arranged in substantially uniformly spaced relation along the bars 27, and in each instance the fins are bent or curved transversely of their lengths and so disposed as to direct the air downwardly in the front end of the motor compartment and also centrally thereof. The result is that the air entering through the several slots 15, 15a and 16 is divided into a plurality of streams distributed substantially uniformly over the entire area of the inlet opening 13, thereby increasing the effectual area of the opening.

The second grille 24, disposed immediately forward of the fan 11, has a series of air guiding and directing elements disposed so as to receive the air transversely directed by the grille 23. In the present instance, the grille 24 is generally of frusto-conical shape, comprising a series of annular transversely bent or curved fins 30 uniformly spaced apart on generally radial plates 31 which are apertured for the passage of the fins transversely thereof. It will be seen that due to the fact that the fins present a forward conical outer face, their outer edge portions are, as in the case of the fins of the grille 23, projected progressively forward from the fan so as to be disposed in the path of the air flowing downwardly in the central portion of the motor compartment.

The grille 24 may be supported in any suitable way. As herein shown (Fig. 1), the inner ends of the plates 31 are secured to or rest upon an annular member or ring 32 encircling the fan hub 12 in closely spaced relation thereto, and the outer ends are fastened to the shroud 20. For this purpose the vanes are formed with fastening lugs 33 at their inner ends, and lugs 34 at their outer ends. Thus the grille is supported as a unit from the forward end of the shroud 20.

The manner in which the air entering the inlet 13 at the top of the motor compartment is controlled by the grille 23 for delivery downwardly and forwardly into the compartment, and then received and delivered to the fan by the fins 30 of the grille 24 constitutes an important feature of my invention. In the absence of these flow control devices, the air entering the compartment at the front and rear edges of the door 14 tends to set up opposing eddy currents and is churned about in the compartment forwardly of the shroud with the result that much of the energy of the fan is wasted. The fins 26 and 26a of the grille 23 cause the entering air to be divided into a plurality of streams so as to utilize the full area of the inlet opening 13, and these streams are then directed into well defined paths downwardly for reception by the grille 24. The progressive elevation of these fins 26 of this grille materially facilitates such division of the air into separate streams. Similarly, the progressive projection of the fins 30 from the outer edge of the grille 24 forwardly and inwardly also contributes substantially to the effectual control of the air and this at a point where a sharp change in the direction of flow is necessary.

Not only does the grille 24 produce a change in direction of the air but it also causes a substantially uniform distribution of the air along the entire length of each of the fan blades. Thus tests have shown that in the absence of control the air has a tendency to crowd into the fan in a relatively narrow radial zone approximately one-third the length of the blades and located centrally thereof. By distributing the air uniformly along the blade, all portions thereof, and especially the rapidly moving tip portions, become operative so that the effectiveness of the fan is greatly increased.

In addition to its supporting function, the central ring 32 contributes to the proper control of the air by the grille 24. Thus the ring constitutes in effect an annular baffle which assists in directing the air rearwardly into the fan.

The effectiveness of the grilles 23 and 24 in controlling the delivery of air to the fan is dependent upon the velocity of the air and this in turn is dependent upon the ability of the fan to force air past the motor to the rear of the compartment. In this latter connection, difficulty has been experienced due to the fact that the propeller fan tends to impart a rotational movement to the air so as to cause it to be discharged transversely of the compartment, whereas the maximum free flow area through the engine is in a direction longitudinally thereof. Moreover, much of the air thus discharged is apt to impinge upon the engine's cylinders so as to be deflected thereby and thus further reduce the effectiveness of the fan.

I have discovered that the difficulty above set forth may be effectually overcome through the provision of air guiding and directing devices of a very simple character disposed immediately forwardly of the fan and operative to direct the air to the fan blades in a manner such as to leave the blades in a generally axial direction. In particular, I provide a plurality of radial vanes spaced apart circumferentially in front of the fan and inclined toward the plane thereof, oppositely of the direction of rotation so as to cause the air to be discharged at high velocity across the leading faces of the fan blades and upon impingement by the latter in a direction longitudinally of the compartment.

In the present embodiment, the radial plates 31 which support the annular fins 30 are constructed to provide radial delivery vanes of the character indicated. For this purpose, the plates are made substantially triangular in form (Fig. 1), with outwardly and rearwardly inclined forward edge portions in which the fins 30 are mounted and with rear edges terminating immediately adjacent the fan. To reduce vibration and the noise incident thereto, the rear edges of the vanes are preferably flanged as at 31b.

Figure 5:
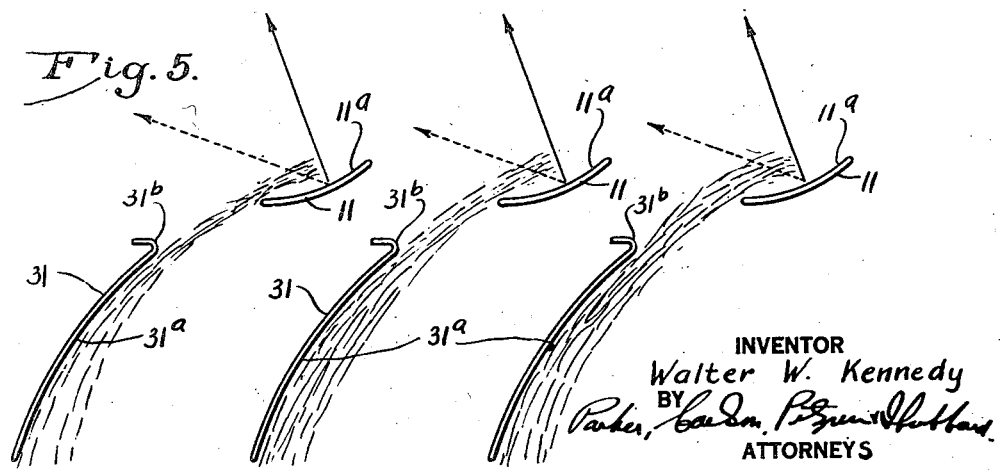
Fig. 5 is a schematic view illustrating the flow of air to and from the fan.

As best shown in Fig. 5, the vanes 31 are inclined sharply toward the plane of fan rotation in a direction opposite to the direction of movement of the blades, so as to form sweep surfaces 31a operative to guide and direct the air across the leading faces 11a of the fan blades. Preferably, the degree of inclination of the vanes corresponds roughly to the pitch of the blades themselves and the vanes and blades are transversely curved but oppositely. With this construction, the air striking the sweep surfaces 31a is guided rearwardly and transversely for engagement by the reversely curved faces of the blades moving oppositely to the direction of the air as is leaves the vanes. The result, it has been found, is that the air is propelled rearwardly approximately in the direction indicated by the arrows in the full lines in Fig. 5 as contrasted with the usual generally transverse direction of flow indicated by the broken line arrows in the same figure.

With the air thus delivered longitudinally, the grille 25 disposed rearwardly of the fan is operative thereon to complete the task of directing the air axially rearward as well as to control the distribution of the air radially. This grille comprises a plurality of transversely curved annular fins 37 supported by radial plates 38 secured at their outer ends to the shroud 20. The fins are spaced apart radially and preferably are bent inwardly so as to direct air toward the inner end portions of the radial cylinder barrels, it being especially required that such portions be prevented from overheating. The supporting plates 38 additionally constitute vanes for guiding the air discharged by the fan. As shown in Fig. 2, the plates 38 are preferably transversely curved, especially along their forward edges. In cooperation with the vanes 31 disposed forwardly of or in upstream relation to the fan, the vanes 38 effect the discharge of the air axially of the motor.

It will be seen that by discharging the air axially relative to the motor, advantage is taken of the maximum free flow area through the engine. At the same time the efficiency of the fan is substantially increased due to the manner in which the air is directed to the fan, it being drawn at high velocity through the restricted inlet opening 13 and thereafter effectually controlled and directed so as to enter the fan with a minimum of impairment to the rate of flow.

The air forced past the motor at high velocity is received by the second set of grilles rearwardly of the motor and guided and directed thereby to facilitate its discharge. For this purpose I employ in the present instance a set of four grilles 40, 41, 42 and 43. In general, these grilles cooperate to increase the volume of air flowing through the compartment by minimizing back pressure and preventing eddying and recirculation of the air. In particular, the grilles 40 and 41 cooperate to receive the air escaping past the motor and direct it upwardly and rearwardly in well defined streams (Figs. 1 and 4) to the outlet opening 18 and this without the use of ducts or the like and without depending upon the walls of the housing.

The grille 40 comprises a multiplicity of vertical fins 44 (Fig. 4) and horizontal fins 45 (Fig. 1). The vertical fins are mounted upon a plurality of cross rods 46 supported at opposite ends in channel bars 47, and the bars 47 in turn are fastened upon horizontal channel bars 48 carrying vertical rods 49 in which are supported the horizontal fins 45. As shown, the grille extends entirely across the motor compartment from side to side and from top to bottom and is secured in position in any suitable way as by means of brackets 50 at opposite ends of the horizontal channel bars 48.

As will be seen from Figs. 1 and 4, the grille 40 assumes control of the air after it leaves the motor, dividing it both horizontally and vertically so as to produce a multiplicity of streams of air directed inwardly and also upwardly for reception by the grille 41 at the outlet opening 18. To accomplish this result the vertical and horizontal fins are appropriately shaped and disposed, the lower ones of the horizontal fins being bent transversely and also positioned to direct the air upwardly, the side vertical fins being also positioned and curved to direct the air inwardly.

The grille 41 comprises simply a plurality of horizontal fins 51 supported upon flat rods 52 extending upwardly and forwardly across the opening 18 and supported in suitable brackets 53 and 54. Here again the horizontal fins 51 are shaped and positioned angularly so as to direct the air rearwardly for delivery to the grille 42.

The grille 42 is of a construction similar in all material respects to the grille 41 and extends upwardly and rearwardly from the lower edge of the outlet opening 18 to the upper rear corner of the angular outlet passage 18a leading from the motor compartment. In brief, this grille comprises a series of fins 55 supported on rods 56 carried by brackets 57 and 58.

To receive and direct rearwardly the air discharging downwardly from the passage 18ᵃ is the function of the grille 43. For this purpose the grille comprises a series of horizontal fins 59 supported by flat upright rods 60. Preferably this grille is mounted for swinging movement. To this end the upper ends of the rod are secured to a channel bar 61 mounted on hinges 62 carried by the rear wall 63 of the tank structure. The grille extends forwardly and downwardly and is suitably secured in position at 64. The fins 59 are spaced apart substantially uniformly and are transversely curved so as to receive the air turned downwardly by the fins 55 and direct the same rearwardly.

It has been found that by the construction and arrangement thus set forth, it is possible to increase the volume of air flowing through the engine compartment of the tank by approximately one hundred percent. In general, the attainment of this result is attributable, first, to the means for increasing the effectiveness of the fan in forcing air in large volume through or past the motor, and, second, to the discovery that the cooling air may, when traveling at high velocity, be conducted across or through relatively large spaces and its direction of flow changed as may be required, without the use of conventional duct work rendered impracticable by the conditions encountered.

In the illustrated embodiment of the invention, the air entering the motor compartment through the restricted inlet opening 13 (Fig. 2) is effectually directed into the region immediately forward of the fan where it is received and redirected rearwardly to the fan. In passing through the opening 13 the air is divided into a multiplicity of streams distributed over the cross sectional area of the opening so as to increase the effective area thereof. At the same time, the air is controlled in its discharge from the grille 23 and directed to the grille 24 for delivery by the latter to the fan. At this point, the delivery vanes 31 cause the air to be directed relative to the fan blades so as to cause discharge of the air in a direction sufficiently close to the axial to permit final correction by the grille 25, which also causes distribution toward the center of the motor. Upon discharge of the air rearwardly past the motor, control is assumed by the grille 40 which serves to direct the air in well defined streams to the relatively small grille 41 offset laterally to one side of the motor compartment.

It will be observed that both forwardly and rearwardly of the compartment the air is controlled in its flow across relatively large spaces simply by means of grilles located at spaced points, the air being effectually prevented from eddying and recirculating, thereby greatly facilitating the work of the fan in moving a sufficiently large volume of air through the compartment. At the same time, the space within the compartment is left relatively free for convenient access to the motor, the various grilles being readily removable as may be desired. Another and important advantage is that the armored vehicles already in the field may be equipped readily with the improved flow facilitating devices.

It will of course be understood that while I have herein shown the invention as applied to the solution of a specific problem such as that encountered in an armored tank, the invention in its broader aspects is susceptible of other applications where conditions are such as to require the directional control of air through spaces or chambers containing obstructions which render it impossible or impracticable to use ducts or other confining walls.

I claim as my invention:

1. Air flow control means for a chamber having a restricted air outlet opening at one end and means for forcing air through the chamber toward said outlet opening, said control means comprising a grille extending transversely of the chamber between said air forcing means and said outlet opening and spaced from the opening comprising a series of fins operative upon the air flowing through the chamber to divide the same into a multiplicity of contiguous streams, the fins being variably inclined so as to cause said streams to converge toward said opening, the cross sectional area of the grille being substantially larger than the opening.

2. Air flow control means for a chamber having opposed substantially parallel side walls and a transverse wall with a restricted outlet opening and means for forcing air through the chamber toward said opening, said control means comprising a grille extending transversely of the chamber between said air forcing means and said opening and comprising two sets of spaced fins with the fins of one set disposed substantially at right angles relative to the fins of the other set, and the fins of both sets acting upon the moving air to divide it into contiguous streams, the fins being variably inclined so as to converge the air streams in two transverse directions toward said restricted opening, the cross sectional area of the grille being substantially larger than the opening.

WALTER W. KENNEDY.

REFERENCES CITED

The following references are of record in the file of this patent:

UNITED STATES PATENTS

| Number | Name | Date |
|---|---|---|
| 500,080 | Rateau | June 20, 1893 |
| 536,925 | Erb | Apr. 2, 1895 |
| 795,054 | Nicewaner | July 18, 1905 |
| 797,533 | Phillips | Aug. 15, 1905 |
| 1,961,315 | Waseige | June 5, 1934 |
| 2,068,851 | Euwer | Jan. 26, 1937 |
| 2,076,225 | Chilton | Apr. 6, 1937 |
| 2,112,608 | Schmidt | Mar. 29, 1938 |
| 2,169,234 | Ponamareff | Aug. 15, 1939 |
| 2,174,418 | Hersey | Sept. 26, 1939 |
| 2,206,418 | Mercier | July 2, 1940 |
| 2,206,995 | Ashley | July 9, 1940 |
| 2,216,046 | Peck | Sept. 24, 1940 |
| 2,217,428 | Alben | Oct. 8, 1940 |
| 2,316,452 | Pfenninger | Apr. 13, 1943 |
| 2,376,331 | Abrams | May 22, 1945 |
| 2,400,617 | Wheller | May 21, 1946 |

FOREIGN PATENTS

| Number | Country | Date |
|---|---|---|
| 436,679 | Germany | Nov. 6, 1926 |